(12) United States Patent
O'Grady

(10) Patent No.: US 6,195,392 B1
(45) Date of Patent: Feb. 27, 2001

(54) METHOD AND ARRANGEMENT FOR GENERATING PROGRAM CLOCK REFERENCE VALUES (PCRS) IN MPEG BITSTREAMS

(75) Inventor: William J. O'Grady, Yonkers, NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/107,528

(22) Filed: Jun. 30, 1998

(51) Int. Cl.[7] ....................................... H04N 7/24
(52) U.S. Cl. ...................... 375/240.28; 370/516; 375/365
(58) Field of Search .............. 375/240.28, 365; 370/516; H04N 7/24

(56) References Cited

U.S. PATENT DOCUMENTS

| | | | |
|---|---|---|---|
| 5,602,920 | * 2/1997 | Bestler et al. ............... | 370/412 X |
| 5,699,392 | 12/1997 | Dokie ........................... | 375/376 |
| 5,881,114 | * 3/1999 | Moon ........................... | 375/376 |
| 5,909,468 | * 6/1999 | Lawrence ...................... | 375/295 |
| 6,072,369 | * 6/2000 | Dhong et al. ................. | 370/516 X |

* cited by examiner

Primary Examiner—Howard Britton
(74) Attorney, Agent, or Firm—Russell Gross (57) ABSTRACT

A method of generating program clock reference values for a digital data stream is provided. The program clock reference value will preferably include a 33-bit base and a 9-bit extension. The method comprises the steps of receiving an input digital data stream having a pixel clock frequency, dividing the input frequency of the pixel clock and producing a counter clock that increments at a rate proportional to the pixel clock, multiplying the counter clock by a rational number to produce a number that indicates time expressed in 27 MHz periods and inputting the resulting value into a divider which divides every input by 300 to produce a quotient representing the Program Clock Reference value base and the remainder representing the Program Clock Reference value extension. A PCR generator for use in, for example, an MPEG encoder is also provided.

13 Claims, 6 Drawing Sheets

METHOD AND ARRANGEMENT FOR GENERATING PROGRAM CLOCK REFERENCE VALUES (PCRS) IN MPEG BITSTREAMS

BACKGROUND OF THE INVENTION

The present invention relates generally to clock-synchronizing techniques, and in particular, to an improved method and arrangement for generating Program Clock Reference values (PCRS) in MPEG bitstreams.

In MPEG, all audio, video, and auxiliary information to be carried within a given data channel is divided into 188 byte long transport packets. Each transport packet is subdivided into a header and a payload. The header may carry information to identify the type of data that is carried within the payload and information required to decode the transport packet stream. A field may be provided within the header with a set of flags to indicate the presence of optional fields, one of which may be a Program Clock Reference (PCR) value. The PCR is a 42-bit value that represents time stamps from a relative system time clock (STC) that is clocked by a periodic signal which is typically 27 MHz within an MPEG encoder. Of the 42 bits, the first 33 bits of the PCR are called the PCR base, and express a value of the encoder system time clock in 90 kHz periods. The remaining nine bits of the PCR value are referred to as the PCR extension, and express a value of the system time clock in 27 MHz periods.

An example of use of this method is in an MPEG encoder. The PCR values within the transport stream produced by the MPEG encoder are used to accurately recover the encoder clock in the MPEG decoder. Accurate synchronization must be maintained between the encoder system time clock and the decoder system time clock in order to properly decode the audio and the video data. The transport stream may be provided with presentation time-stamps (PTSs) to indicate to the MPEG decoder when to present the individual video and audio data frames to the user. The value of each PTS is ultimately dictated by the frequency of the encoder clock in the encoder, which clocks a system time clock in the MPEG encoder. When encoding the data, the MPEG encoder inserts the PTSs into the transport stream based on samples of the system time clock. The decoder clock in the MPEG decoder therefore operates at the same frequency as the encoder clock.

To synchronize the MPEG decoder clock with the MPEG encoder clock, the MPEG standard suggests that the PCR values be used to implement a clock recovery system. U.S. Pat. No. 5,699,392 illustrates an MPEG suggested architecture for a clock recovery system.

To maintain synchronization, a phase-locked loop may be provided in the clock recovery system. For an MPEG transport stream, a voltage controlled oscillator operates at a nominal oscillation frequency of 27 MHz and has a control input allowing the oscillation frequency to be varied proportionally to input control voltage. That is, the frequency of the oscillator may be adjusted within a small range surrounding the 27 MHz nominal frequency. Application of the control signal to the voltage controlled oscillator therefore increases or decreases the oscillation frequency of the voltage controlled oscillator to adjust the frequency towards the oscillation frequency of the clock within the encoder.

As discussed in U.S. Pat. No. 5,699,392, the MPEG standard suggests an architecture for recovering the encoder clock from the PCR values contained in the transport stream. It is therefore desirable to develop a PCR generator construction for, and a method of generating PCRs in an MPEG encoder in a simple yet effective manner that eliminates the need for expensive components presently necessary in state of the art PCR generator constructions. By constructing such an arrangement, a minimum amount of hardware is required thereby minimizing the cost of the overall system and allowing the system to be more advantageously mass produced. The PCR generator disclosed herein achieves the aforementioned and below mentioned objectives.

SUMMARY OF THE INVENTION

Generally speaking, in accordance with the invention, a method of generating program clock reference values for a digital data stream is provided. The program clock reference value will preferably include a 33-bit base and a 9-bit extension. In the preferred embodiment, the method comprises the steps of receiving an input digital data stream having a pixel clock frequency, dividing the pixel clock frequency and producing a counter clock that increments at a rate proportional to the pixel clock, multiplying the counter clock by a rational number to produce a number that indicates time expressed in 27 MHz periods and inputting the resulting value into a divider which divides every input by 300 to produce a quotient representing the PCR value base and the remainder representing the PCR value extension.

Also in accordance with the present invention, a PCR generator for use in an MPEG encoder which carries out the aforementioned steps is provided. A system using the present invention is also disclosed herein.

Accordingly, it is an object of the present invention to provide an improved PCR generator for use in an MPEG encoder.

It is also an object of the present invention to provide an improved method of generating PCRs in an MPEG encoder.

Another object of the present invention is to construct an improved PCR generator that requires less expensive hardware than presently required in known PCR generators in MPEG encoders.

Another object of the present invention is to construct an improved PCR generator that results in an overall reduction in the cost of PCR generators and thus MPEG encoders.

Still other objects and advantages of the invention will in part be obvious and will in part be apparent from the specification.

The invention accordingly comprises the features of construction, combination of elements, arrangement of parts and sequence of steps which will be exemplified in the construction and methodology hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
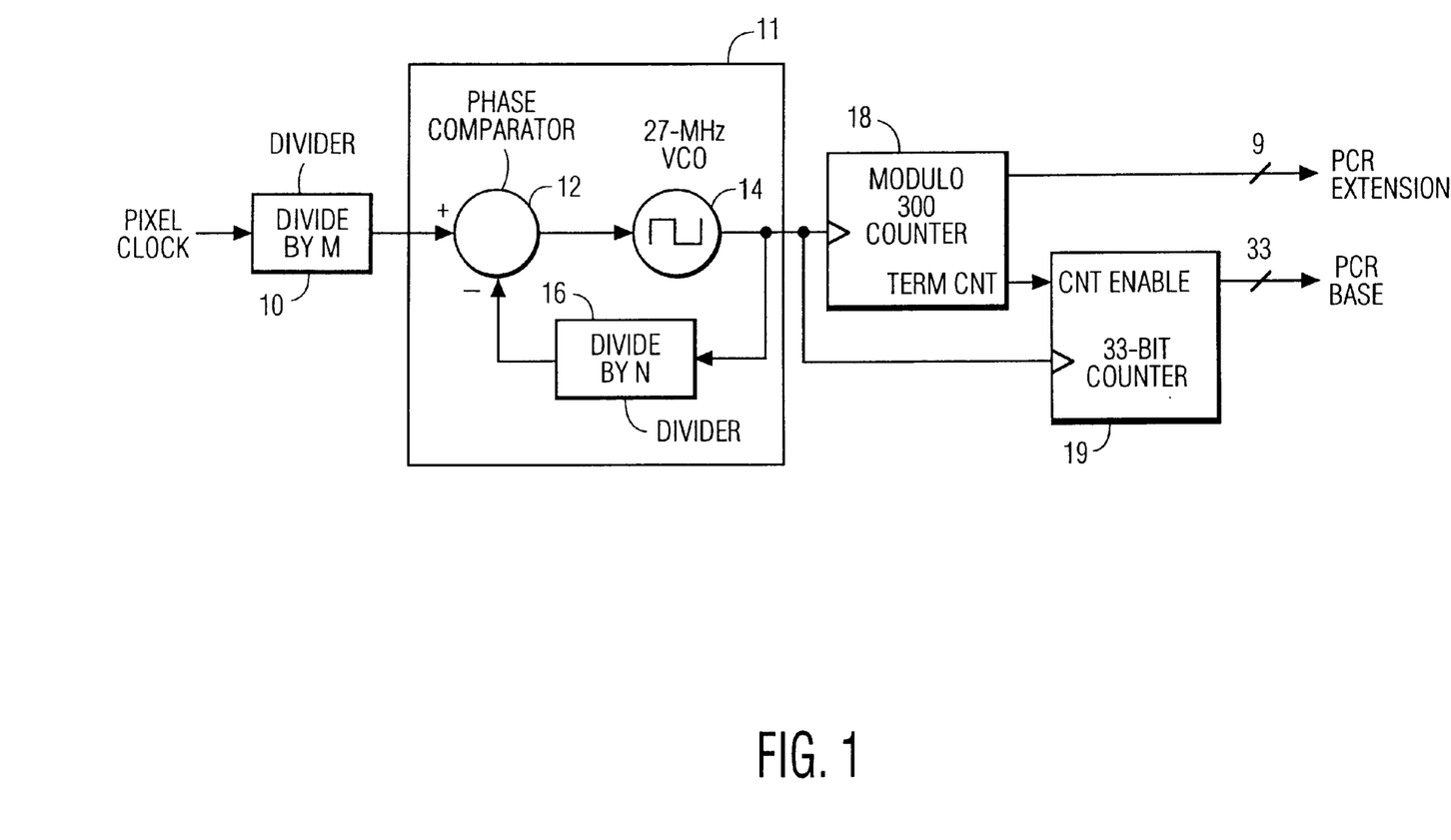
FIG. 1 is a block diagram of a PCR generator utilized in an MPEG encoder in accordance with the prior art.

Reference is first made to FIG. 1 which illustrates a PCR generator in an MPEG encoder in accordance with the prior art. Specifically, input video having a pixel clock which will typically be equal to 27 MHz multiplied by a rational number m/n, is inputted to a divider 10. Divider 10 is coupled to a phase-locked loop 11 which itself includes a phase comparator 12, a 27 MHz voltage-controlled oscillator 14 coupled to the output of phase comparator 12, and a divider 16 which is coupled between the output of oscillator 14 and the negative input of phase comparator 12. Phase-locked loop 11 generates a signal which is nominally 27 MHz and is locked to the incoming pixel clock. A modulo-300 counter 18 is coupled to the output of phase-locked loop 11 and is clocked thereby. Counter 18 includes a 9-bit output which repeatedly increments from 0 to 299. A 33-bit counter 19 is also included and is clocked by the output of phase-locked loop 11 and enabled by the "term cnt" output of counter 18 and the output of phase-locked loop 11. When counter 18 reaches 299, the "term-cnt" output of counter 18 enables counter 19 to increment by one. The output of counter 18 represents the PCR extension and provides a measure of time expressed in 27 MHz periods. Counter 19 increments once every 300 clock cycles, and thus provides a coarser indication of time expressed in 90 kHz periods.

Figure 2:
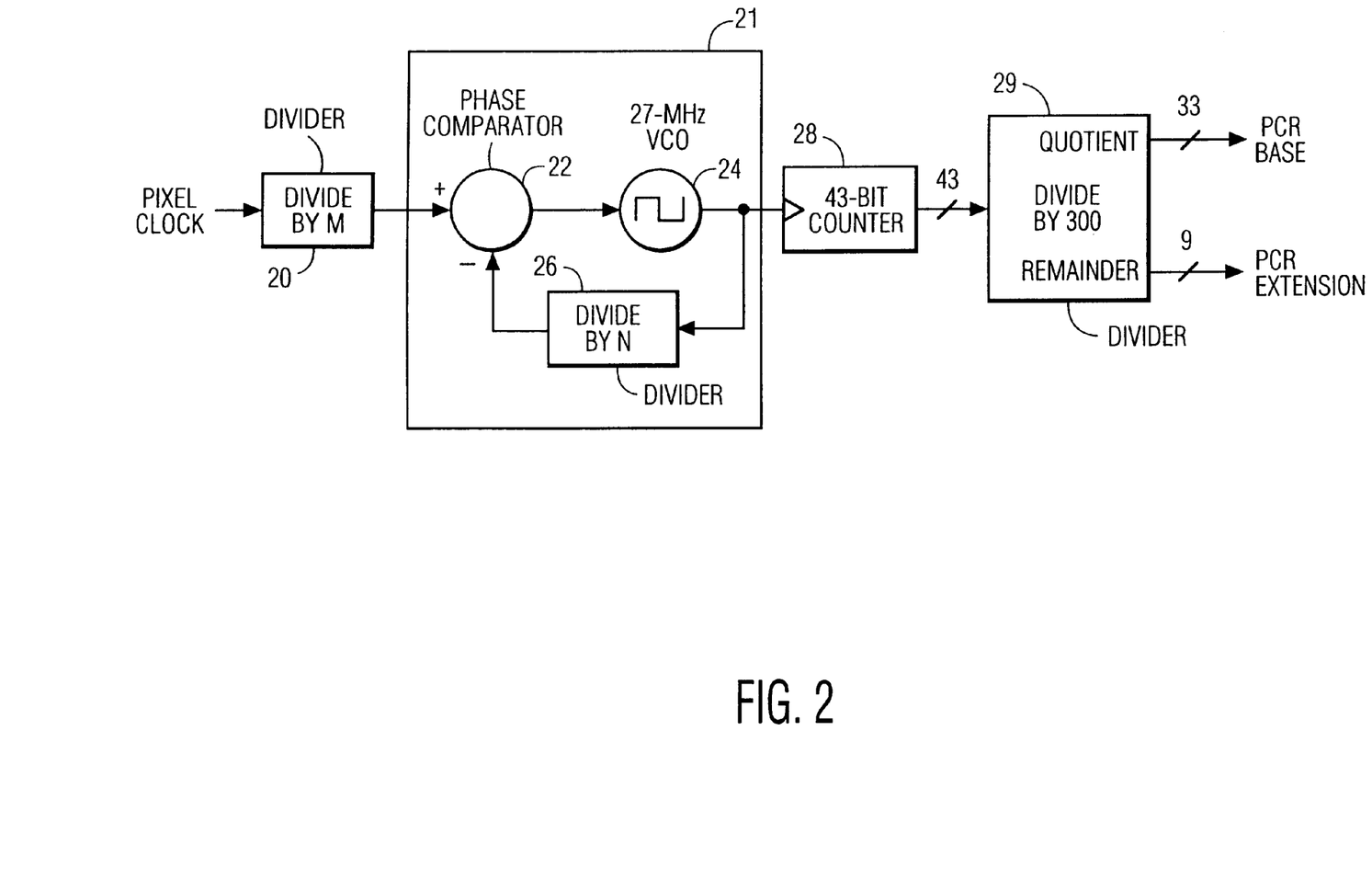
FIG. 2 is an alternate embodiment of a PCR generator in an MPEG encoder in accordance with the prior art.

Reference is now made to FIG. 2 which illustrates an alternate construction of a PCR generator in an MPEG encoder utilized to generate PCRs in accordance with the prior art. Specifically, this alternative arrangement will also provide input video having a pixel clock to the input of a divider 20, which itself is coupled to a phase-locked loop 21 constructed in similar fashion to phase-locked loop 11. That is, phase-locked loop 21 includes a phase comparator 22, a 27 MHz voltage-controlled oscillator 24 and a divider 26. In this alternative embodiment however, the output of phase-locked loop 21 is coupled to the input of a 43-bit counter 28. A divide-by-300 divider 29 is coupled to the output of counter 28. Counter 28 increments by one every 27 MHz period by way of its coupling to the output of oscillator 24. The output of counter 28 is divided by 300 in divider 29 in a similar manner as in FIG. 1. The quotient increments by one every 300 clock cycles and is used as the PCR base. The remainder repeatedly goes from 0 to 299 and is used as the PCR extension.

As will be clear to one of ordinary skill in the art, the constructions for and method of generating PCRs illustrated in FIGS. 1 and 2 require the inclusion of phase-locked loops with 27 MHz voltage controlled oscillators. These phase-locked loops can be costly and therefore should be desirably eliminated if possible. The construction for and method of generating PCRs illustrated in FIG. 3 in accordance with the present invention achieves the goal of desirably eliminating the aforementioned phase-locked loops.

Figure 3:
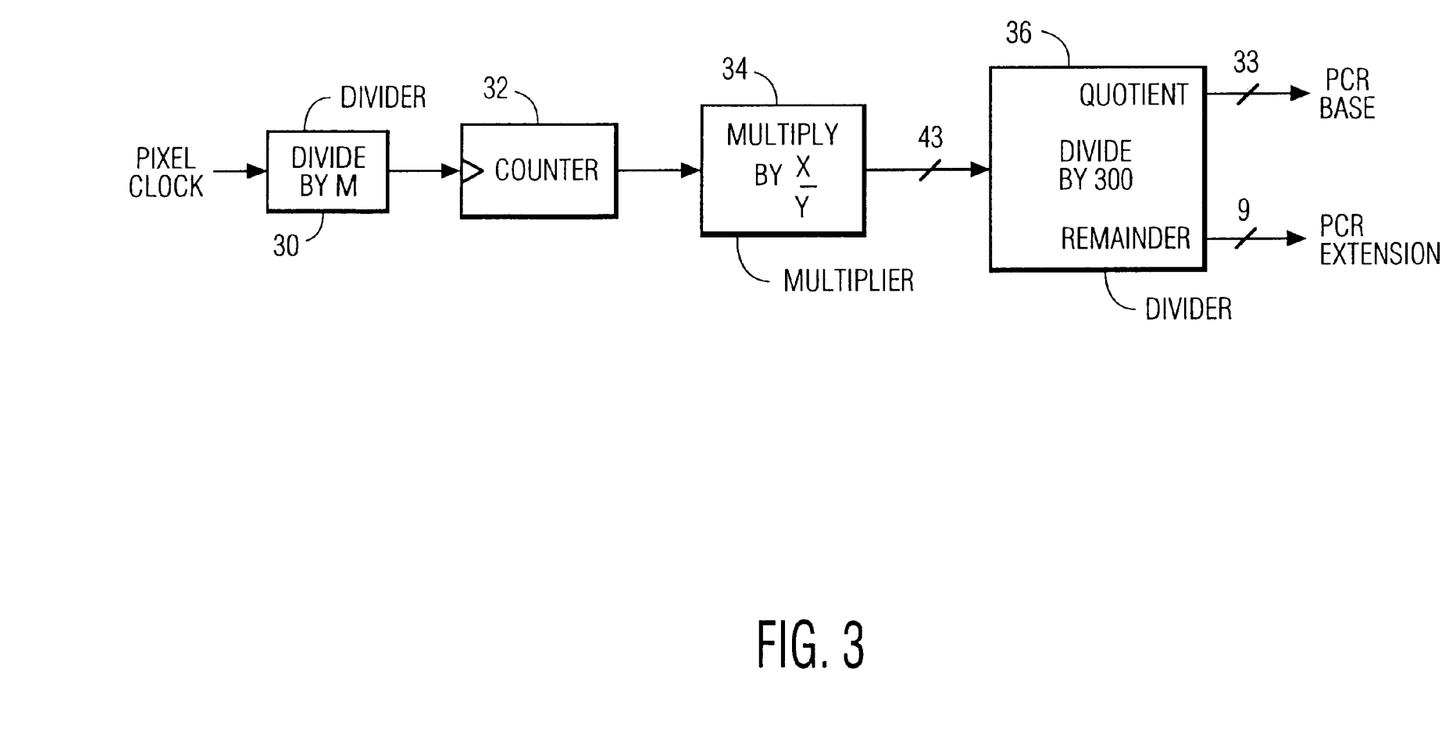
FIG. 3 is a block diagram of a PCR generator for use in an MPEG encoder in accordance with the present invention.

Reference will therefore now be made to FIG. 3 which illustrates the construction of a PCR generator in an MPEG encoder in accordance with the present invention.

Generally speaking, the preferred PCR generator construction includes a divider 30 which receives input video having a pixel clock. Divider 30 is coupled to a counter 32, which itself is coupled to a multiplier 34. It should be understood that multiplier 34 really comprises a multiplier and a divider, wherein the included multiplier multiplies by x and the divider divides by y, as explained below. In this preferred embodiment, the output of multiplier 34 is coupled to the input of a divide-by-300 divider 36.

In operation, counter 32 is clocked directly by a periodic signal having a frequency equal to the pixel clock frequency divided by integer m in divider 30. The output of counter 32 therefore can be considered to be an indication of time measured in units which in general are not 27 MHz clock periods. In the contemplated applications of the present invention, it may be assumed that the pixel clock frequency will be a rational number equal to i/j where i and j are integers. The frequency at the output of divider 30 will be $$\frac{27 \times 10^6}{(i/[(j)(m)])}$$

Accordingly, time measured in 27 MHz periods can be calculated by multiplying the output of counter 32 by $$\frac{(j)(m)(27 \times 10^6)}{i}$$

which is equal is equal to $$\frac{(j)(m)(27 \times 10^6)}{i} = \frac{a_1 \, a_2 \, a_3 \ldots a_p}{b_1 \, b_2 \, b_3 \ldots b_q}$$

In one implementation of the preferred embodiment, this ratio is simplified to a ratio of two integers that are as small as possible. This is accomplished by representing the numerator and the denominator of the ratio as products of prime numbers. Thus, $$\frac{i}{jm}$$

Prime numbers that appear in both the numerator and denominator are canceled so there are no prime numbers that appear in both the numerator or denominator. The resulting ratio contains the smallest possible numerator and denominator that can be used for x and y respectively in multiplier 34.

For example, if the pixel clock frequency is 102 MHz and divider 30 is a divide-by-two divider (i.e. m=2), the output of counter 32 increments by one every 51 MHz period. Thus, counter 32 increments 51/27 times faster than it would if it were clocked by 27 MHz. Time measured in 27 MHz periods can therefore be calculated by multiplying the output of counter 32 by 27/51. The following is this ratio expressed as the product of a set of prime numbers divided by the product of another set of prime numbers:

$$\frac{3 \times 3 \times 3}{3 \times 17}$$

This can be reduced to $$\frac{3 \times 3}{17}$$

which is equal to 9/17. Thus, x and y in multiplier 34 can be 9 and 17, respectively.

Figure 4:
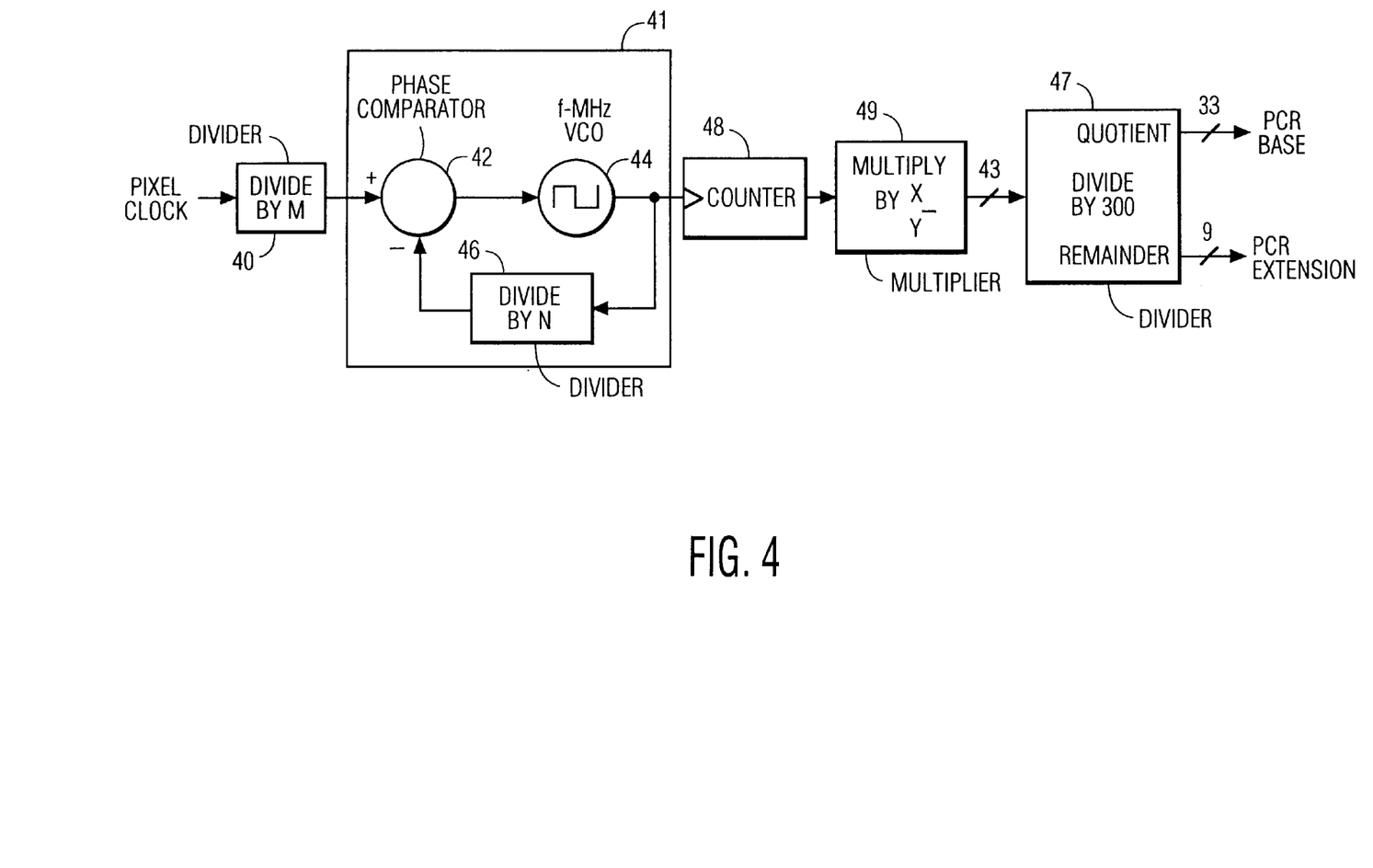
FIG. 4 is an alternative block diagram construction of a PCR generator in an MPEG encoder in accordance with the present invention.

Reference is now made to FIG. 4 which illustrates an alternative construction for a PCR generator for an MPEG encoder construction which contains a phase-locked loop which generates a frequency (f) which is locked to a pixel clock. However, in this alternative embodiment, frequency (f) is not 27 MHz. Illustrated in FIG. 4 is input video having a pixel clock which is coupled to a divider 40. Divider 40 divides down the pixel clock frequency by a factor of m. Divider 10 is coupled to a phase-locked loop 41 which includes a phase comparator 42, an f MHz voltage-controlled oscillator 44 coupled to the output of phase comparator 42, and a divider 46 which is coupled between the output of oscillator 44 and the negative input of phase comparator 42. Phase-locked loop 41 is coupled to a counter 48 which itself is coupled to a multiplier 49. Again it should be understood that multiplier 49 really expresses the combination of a multiplier and a divider as would be understood in the art. Multiplier 49 is coupled to a divider 47. Divider 47 includes a 9-bit output which outputs the PCR extension and a 33-bit output which represents the PCR base.

In this alternate embodiment, oscillator 44 provides the clock frequency for counter 48. The output of counter 48 therefore can be considered to be an indication of time measured in units which are equal to one period of oscillator 44. In the contemplated applications of the present invention, it may be assumed that the pixel clock frequency will be a rational number equal to i/j where i and j are integers. The frequency at the output of phase-locked loop 41 will be $$\frac{(i)(n)}{(j)(m)}$$

where m and n are the divisors in divider 40 and divider 46 respectively. Accordingly, time measured in 27 MHz periods can be calculated by multiplying the output of counter 48 by $$\frac{27 \times 10^6}{[(i)(n)/(j)(m)]}$$

which is equal to $$\frac{(j)(m)(27 \times 10^6)}{(i)(n)}$$

In one implementation of the alternate preferred embodiment, this ratio is simplified to a ratio of two integers that are as small as possible. This is accomplished by representing the numerator and the denominator of the ratio as products of prime numbers. Thus, $$\frac{(j)(m)(27 \times 10^6)}{(i)(n)} = \frac{a_1 a_2 a_3 \ldots a_p}{b_1 b_2 b_3 \ldots b_q}$$

Prime numbers that appear in both the numerator and denominator are canceled so there are no prime numbers that appear in both the numerator or denominator. The resulting ratio contains the smallest possible numerator and denominator that can be used for x and y respectively in multiplier 43 as illustrated above with reference to FIG. 3.

Figure 6A:
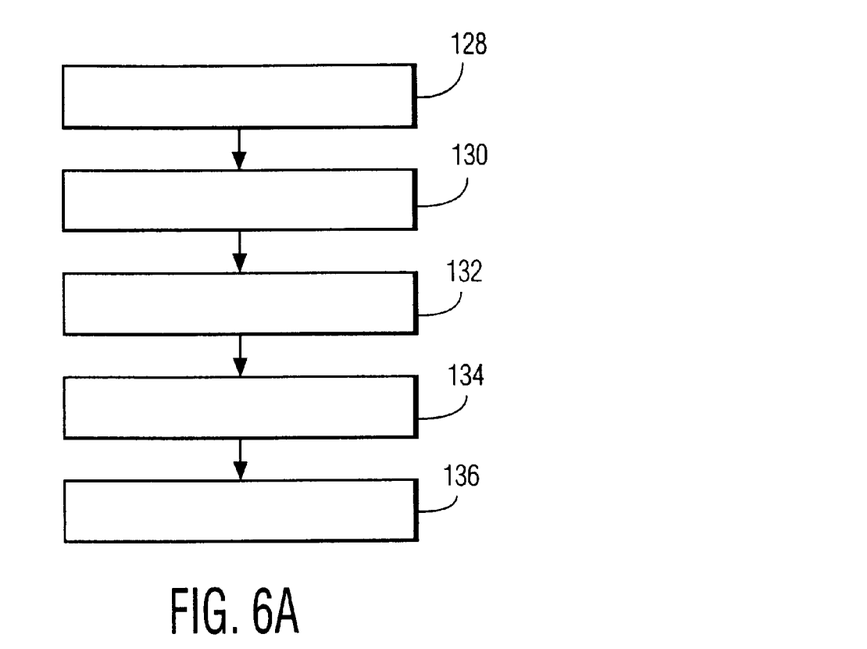
FIGS. 6A and 6B are flowcharts illustrating the method of generating Program Clock Reference values in accordance with the present invention.
Figure 6B:
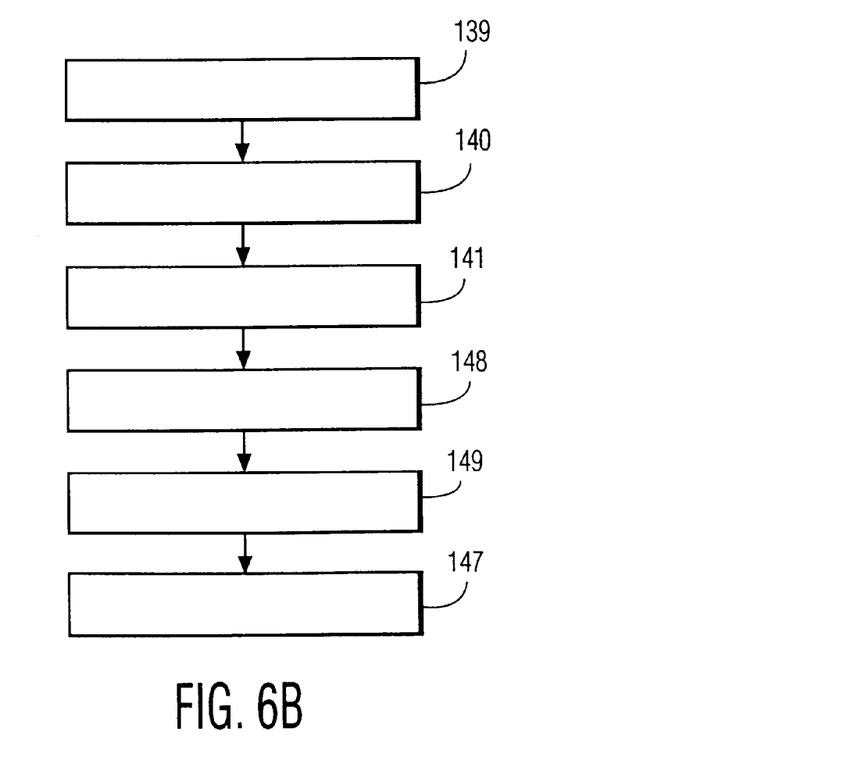

FIGS. 6A and 6B are flowcharts that summarizes the foregoing steps and specifically, illustrate the preferred method of generating Program Clock Reference values for a digital data stream. As illustrated in FIG. 6A, the method includes the steps of receiving an input digital data stream (step 128) having a pixel clock frequency, dividing, in a divider, by an integer m, the input frequency of the pixel clock (step 130), outputting a counter clock count from a counter that increments at a rate proportional to the pixel clock (step 132), multiplying the counter clock frequency in a multiplier by a rational number represented by (x/y) to produce a number that indicates time expressed in 27 MHz periods (step 134), and inputting the resulting value into a divider (step 136) which divides every input by 300 to produce a quotient representing the Program Clock Reference value base and the remainder representing the Program Clock Reference value extension. The rational number may be determined by expressing the output of the counter as a ratio of $$\frac{(y)(m)(27 \times 10^6)}{x}$$

and reducing the ratio such that no prime numbers appear in both the numerator or denominator thereof wherein the numerator of the ratio represents the value of y and the denominator represents the value of x.

In an alternative approach to generating Program Clock Reference values for a digital data stream as illustrated in FIG. 6B, the method may comprise the steps of receiving an input digital data stream (step 139) having a pixel clock frequency, dividing, in a divider, the input frequency by an integer m (step 140), inputting the divided input frequency to a phase-locked loop (step 141) which includes an f MHz voltage controlled oscillator, where f is an integer value and the voltage controlled oscillator provides an oscillator clock having an oscillator clock frequency for a counter, counting (step 148), in the counter, the number of clock cycles from the voltage controlled oscillator clock, multiplying (step 149) in a multiplier, the output of the counter by a rational number represented by (x/y) to produce a number that indicates time expressed in 27 MHz periods, and inputting the resulting value (step 147) into a divider which divides every input by 300 to produce a quotient representing the Program Clock Reference value base and the remainder representing the Program Clock Reference value extension.

Figure 5:
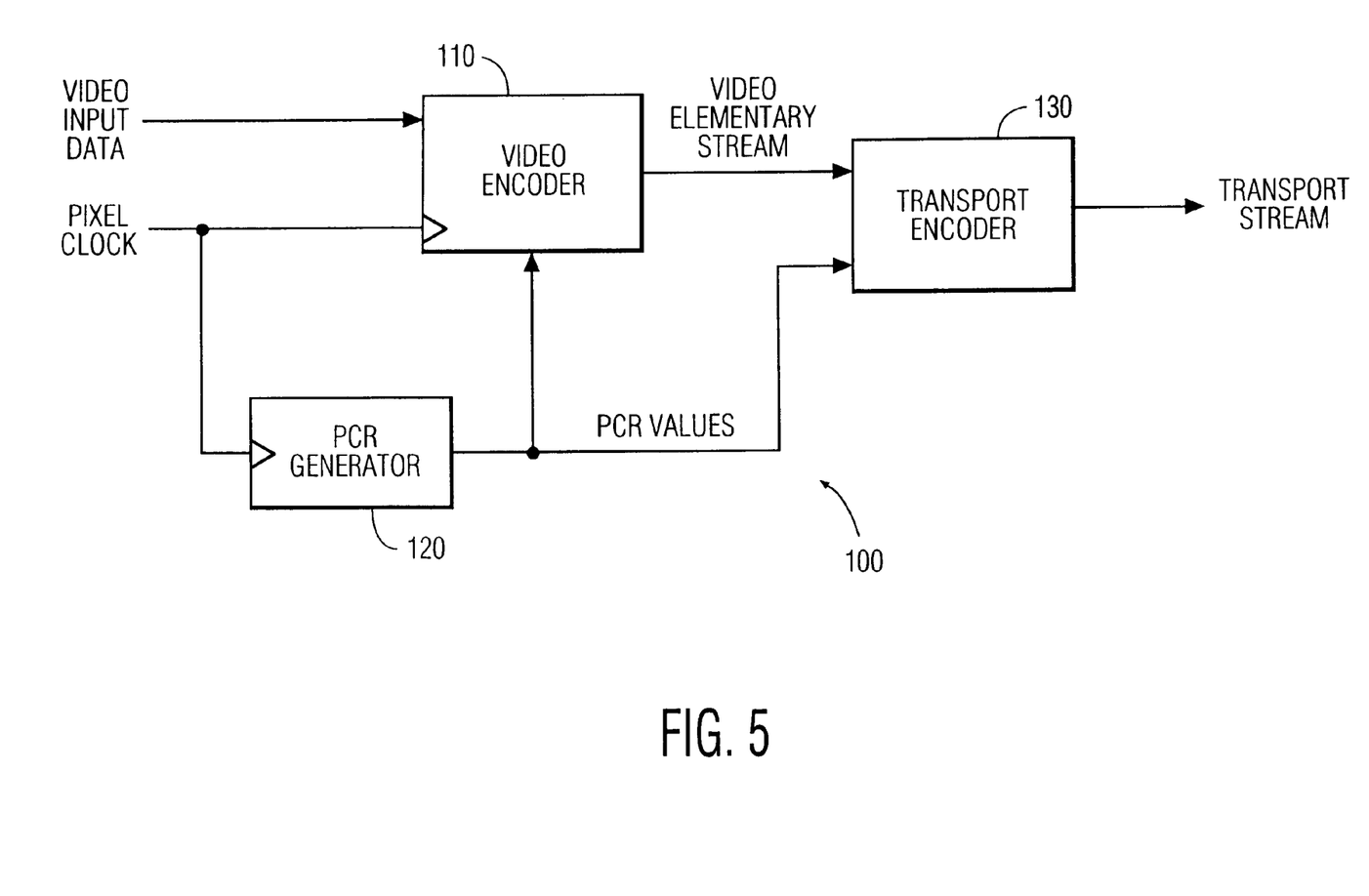
FIG. 5 is a block diagram of an encoding system utilizing the present invention.

The techniques described herewith for generating PCR values can be used in any system that generates bitstreams (compressed or uncompressed) including but not limited to encoders, program splicers and multiplexors. FIG. 5 illustrates an example of a system generally indicated at 100, that produces MPEG transport layer bitstreams using an embodiment of the present invention. In this example, digitalized video accompanied by a pixel-rate clock signal are input to a video encoder 110 which produces a compressed video elementary stream. The pixel-rate clock signal is also input to a generator 120 of PCR values which uses the techniques described herewith. The PCR values are also input to video encoder 110 so they can be used as required. The video elementary stream from video encoder 110 and the PCR values from PCR generator 120 are input to a transport encoder 130 so the PCR values can be included in the transport layer information by methods known in the art. The output of transport encoder 130 therefore contains the PCR values that are needed in a compliant transport stream.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

For example, it should be understood that references to encoders are used by way of example, as the present invention as discussed above is applicable for use in splicers and multiplexors by way of other examples.

It should be understood that references to MPEG are intended to include MPEG-2, but the invention can also be used with other video coding formats (compressed or uncompressed) having clock references including but not limited to MPEG-1, MPEG-4 etc.

It is also to be understood that the following claims are intended to cover all of the generic and specific features of the invention described herein and all statements of the scope of the invention which as a matter of language might fall therebetween.

What I claim is:

1. A method of generating Program Clock Reference values for a digital data stream, wherein the Program Clock Reference values are represented by a 33-bit base and a 9-bit extension, the method comprising the steps of:

receiving an input digital data stream having a pixel clock frequency;

outputting a counter clock count from a counter that increments at a rate proportional to the pixel clock;

multiplying the counter clock count in a multiplier by a rational number represented by (x/y) to produce a number that indicates time expressed in 27 MHz periods; and inputting the resulting value into a divider which divides every input by 300 to produce a quotient representing the Program Clock Reference value base and the remainder representing the Program Clock Reference value extension.

2. The method as claimed in claim 1, wherein the rational number is determined by the steps of:

expressing the output of the counter as a ratio of $$\frac{(y)(m)(27 \times 10^6)}{x}$$

and reducing the ratio such that no prime numbers appear in both the numerator or denominator thereof;

wherein the numerator of the ratio represents the value of y and the denominator represents the value of x.

3. The method as claimed in claim 1, including the step of dividing, in a divider, by an integer m, the input frequency of the pixel clock when m does not equal 1.

4. A method of generating Program Clock Reference values for a digital data stream, wherein the Program Clock Reference values represented by a 33-bit base and a 9-bit extension, the method comprising the steps of:

receiving an input digital data stream having a pixel clock frequency;

inputting the divided input frequency to a phase-locked loop which includes an f MHz voltage controlled oscillator, where f is a rational number and the voltage controlled oscillator provides a oscillator clock having an oscillator clock frequency to a counter;

counting, in the counter, the number of clock cycles from the voltage controlled oscillator clock;

multiplying, in a multiplier, the output of the counter by a rational number represented by (x/y) to produce a number that indicates time expressed in 27 MHz periods; and inputting the resulting value into a divider which divides every input by 300 to produce a quotient representing the Program Clock Reference value base and the remainder representing the Program Clock Reference value extension.

5. The method as claimed in claim 4, wherein the rational number is determined by the steps of:

expressing the output of the counter as a ratio of $$\frac{(y)(m)(27 \times 10^6)}{x}$$

and reducing the ratio such that no prime numbers appear in both the numerator or denominator thereof;

wherein the numerator of the ratio represents the value of y and the denominator represents the value of x.

6. The method as claimed in claim 4, including the step of dividing, in a divider, the input frequency by an integer m when m does not equal 1.

7. A Program Clock Reference generator for generating Program Clock Reference values from an input video having a pixel clock frequency, the generator comprising:

a counter, for counting the periodic signal having a frequency equal to the pixel clock frequency a multiplier, coupled to the output of the counter, for multiplying the output of the counter by x/y, where x and y are integers;

a divider including a 9-bit output and a 33-bit output which divides every input by 300 to produce a quotient representing the Program Clock Reference value base and the remainder representing the Program Clock Reference value extension.

8. The generator as claimed in claim 7, including a divider for receiving the input video and dividing the clock frequency by an integer m when m is not equal to 1.

9. A Program Clock Reference generator for generating Program Clock Reference values from an input video having a pixel clock frequency, the generator comprising:

a phase-locked loop including an f MHz voltage controlled oscillator, where f is an integer value and the voltage controlled oscillator provides the clock frequency for a counter;

the counter, coupled to the phase-locked loop, for counting the clock cycles outputted from the phase-locked loop;

a multiplier, coupled to the output of the counter, for multiplying the output of the counter by x/y, where x and y are integers;

a divider including a 9-bit output and a 33-bit output which divides every input by 300 to produce a quotient representing the Program Clock Reference value base and the remainder representing the Program Clock Reference value extension.

10. The generator as claimed in claim 9, including a divider for receiving the input video and dividing the clock frequency by an integer m when m is not equal to 1.

11. A system that generates compressed bitstreams, the system comprising:

a video encoder, which receives as inputs digitalized video and a pixel-rate clock signal, for producing a compressed video elementary stream;

a Program Clock Reference generator for generating Program Clock Reference values as claimed in claim 7;

a transport encoder for receiving the Program Clock Reference values generated by the Program Clock Reference generator and for receiving the video elementary stream from the video encoder, for outputting a transport stream that includes Program Clock Reference values generated by the Program Clock Reference generator.

12. A system that generates compressed bitstreams, the system comprising:

a video encoder, which receives as inputs digitalized video and a pixel-rate clock signal, for producing a compressed video elementary stream;

a Program Clock Reference generator for generating Program Clock Reference values as claimed in claim 9;

a transport encoder for receiving the Program Clock Reference values generated by the Program Clock Reference generator and for receiving the video elementary stream from the video encoder, for outputting a transport stream that includes Program Clock Reference values generated by the Program Clock Reference generator.

13. A method of generating Program Clock Reference values for a digital data stream, comprising the steps of:

receiving an input digital data stream having a pixel clock at an input frequency;

outputting a counter clock count from a counter that increments at a rate proportional to the pixel clock;

multiplying the counter clock count in a multiplier by a rational number represented by (x/y) to produce a number that indicates time expressed in equal periods; and inputting the resulting value into a divider which divides every input to produce a quotient representing the Program Clock Reference value base and the remainder representing the Program Clock Reference value extension.

\* \* \* \* \*